Feb. 9, 1954   G. P. KILLIAN ET AL   2,668,344
FIELD JOINT MOLD

Filed Feb. 25, 1953   2 Sheets-Sheet 1

INVENTORS
George P. Killian and
James A. Killian

BY Mason, Fenwick & Lawrence
ATTORNEYS

Feb. 9, 1954
G. P. KILLIAN ET AL
2,668,344
FIELD JOINT MOLD
Filed Feb. 25, 1953
2 Sheets-Sheet 2
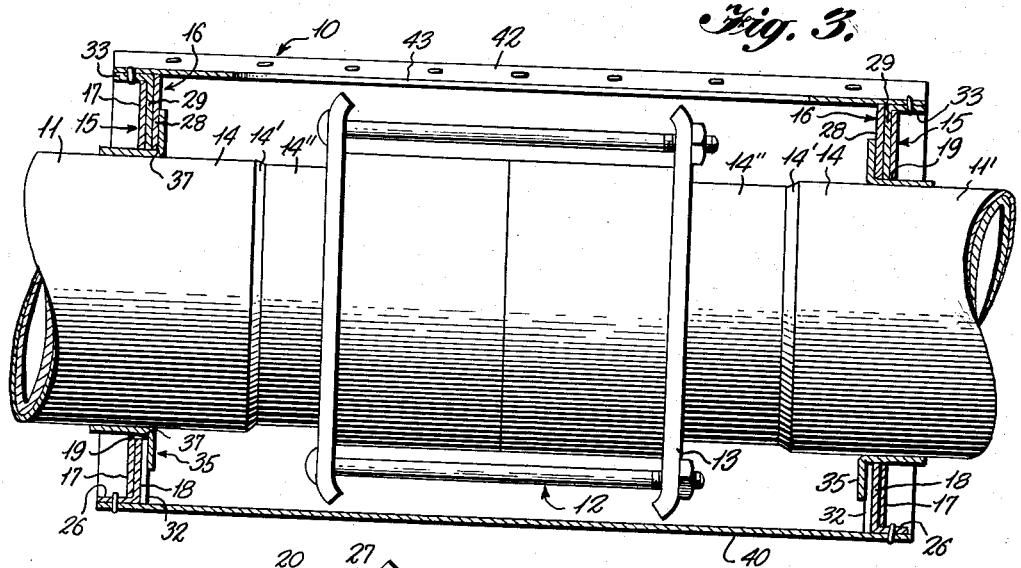
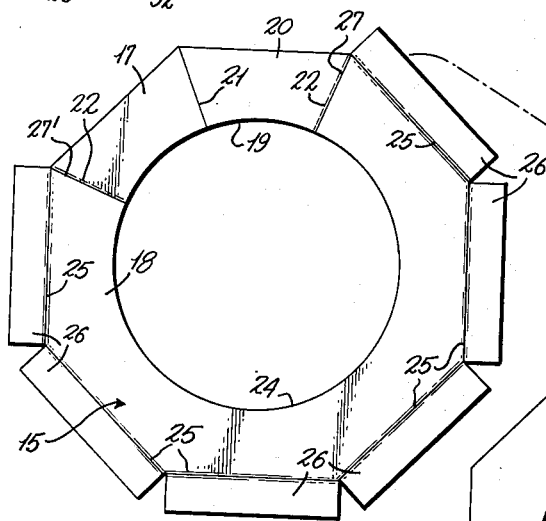
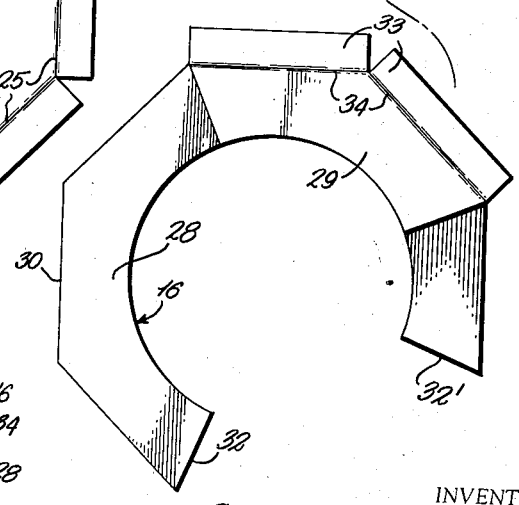
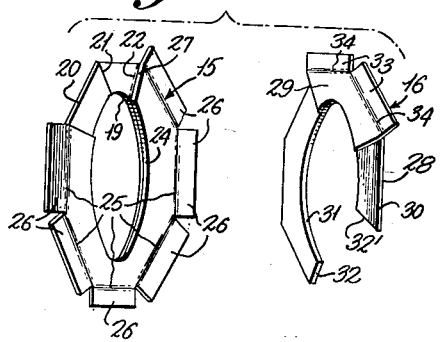
INVENTORS
George P. Killian and
James A. Killian
BY Mason, Fenwick & Lawrence
ATTORNEYS Patented Feb. 9, 1954

2,668,344

UNITED STATES PATENT OFFICE 2,668,344

FIELD JOINT MOLD

George P. Killian, Alexandria, Va., and James A. Killian, Bethesda, Md.

Application February 25, 1953, Serial No. 338,838

6 Claims. (Cl. 25—127)

The present invention relates in general to molds for application of corrosion-resistant coating materials to pipe joints, field couplings and the like, and more particularly to molding boots of sheet material such as cardboard or the like, to be assembled about field joint couplings of gas main sections to facilitate molding of corrosion-resistant coatings about the field joint.

The present invention is particularly designed for use in connection with pipe-lines or mains for distributing city gas, and will be described in connection with this specific application. It is to be understood, however, that the invention is readily adaptable for use in connection with pipe conduit systems generally, such as for forming lead coated joints in plumbing systems and the like.

One of the greatest problems arising in connection with maintenance of pipe and conduit systems for city gas is that of corrosion control or mitigation. Pipe-lines and pipe systems for conveying gaseous fuel require special coupling procedures in constructing the field joints intercoupling the various pipe sections of the system, to prevent the escape of gas from the field joints. Since such gas pipe-lines are usually laid in the soil, and exposed metallic pipe surfaces are therefore particularly subject to corrosion on contact with the soil, special measures must be taken to prevent corrosion.

It is preferable in constructing such gas pipelines to employ steel pipe. Steel pipe, however, intensifies the corrosion problem since contact of certain soils with the surface of the steel pipes sets up galvanic action which releases steel ions from the pipe. This release of steel ions is exhibited as corrosion. In order to avoid the corrosion effect of soil on the steel pipe, the pipe must be coated continuously throughout its length to insulate the steel surface from contact with the soil. Steel pipe sections to be employed in such pipe-lines are now supplied by commercial sources with a layer of coating material preformed thereon and extending continuously along the pipe section to a point spaced slightly from each end of the pipe section. These coatings are usually formed of hot coating enamel made out of pitch, asphalt or other bituminous products.

When such commercially available steel pipe sections are assembled to form a pipe-line, the coupling elements between the respective pipe sections and the area of the pipe immediately adjacent the field joint are in an uncoated state, and must, therefore, be completely coated with corrosion-resistant material after the pipe sections have been intercoupled. It has been the conventional practice heretofore to completely envelop the coupling joint with such a corrosion-resistant coating by wrapping sheet material about the coupling elements and joint with the ends of the sheet material extending beyond the ends of the pre-formed coating on the commercially supplied pipe sections to define an enclosure into which molten material may be poured about the joint. The sheet material forming the wrapping is bound at each end to the surface of the joined pipe sections, and openings are left in an upwardly facing portion of the wrapping through which the molten coating material can be poured. This method requires a considerable amount of skilled labor because of the precision with which the wrapping must be formed, but does not usually insure adequate protection of the downwardly facing portions of the pipe since it is extremely difficult to prevent the pipe and coupling elements from sagging against the lower portions of the wrapping and thereby preventing the under-portions of the joint from being properly coated.

An object of the present invention, therefore, is the provision of a novel mold unit for applying corrosion-resistant materials to pipe joints and the like which is formed of inexpensive materials, which may be shipped and stored in flat condition, and which obviates the disadvantages incident to the above described method of coating pipe joints.

Another object of the present invention is the provision of a novel mold unit to be applied to field pipe joints and couplings in gas conduit systems, which is adapted to receive and mold corrosion-resistant coatings continuously over the uncoated areas of the pipe joints and couplings.

Another object of the present invention is the provision of a mold boot for coating pipe joints and couplings in gas conduit systems with a molten corrosion resistant material, which mold boot may be readily assembled without the use of skilled labor.

Another object of the present invention is the provision of a novel molding boot for forming corrosion-resistant coatings about pipe joints in gas conduit systems, which may be readily assembled from sections of sheet material such as cardboard or the like, and which when assembled insure that proper thicknesses of coating material will be formed about the pipe joint.

Other objects, advantages and capabilities of the present invention will become apparent from the following detail description, taken in conjunction with the accompanying drawing, wherein only a preferred embodiment of the invention is illustrated.

In the drawing:

Figure 3 is a vertical longitudinal section taken along the lines 3—3 of Figure 2;

Figure 4 is an exploded elevation of the pair of end wall sections employed in assembling the instant molding boot; and Figure 5 is a perspective view of the two end wall sections shown in Figure 4.

Figure 1:
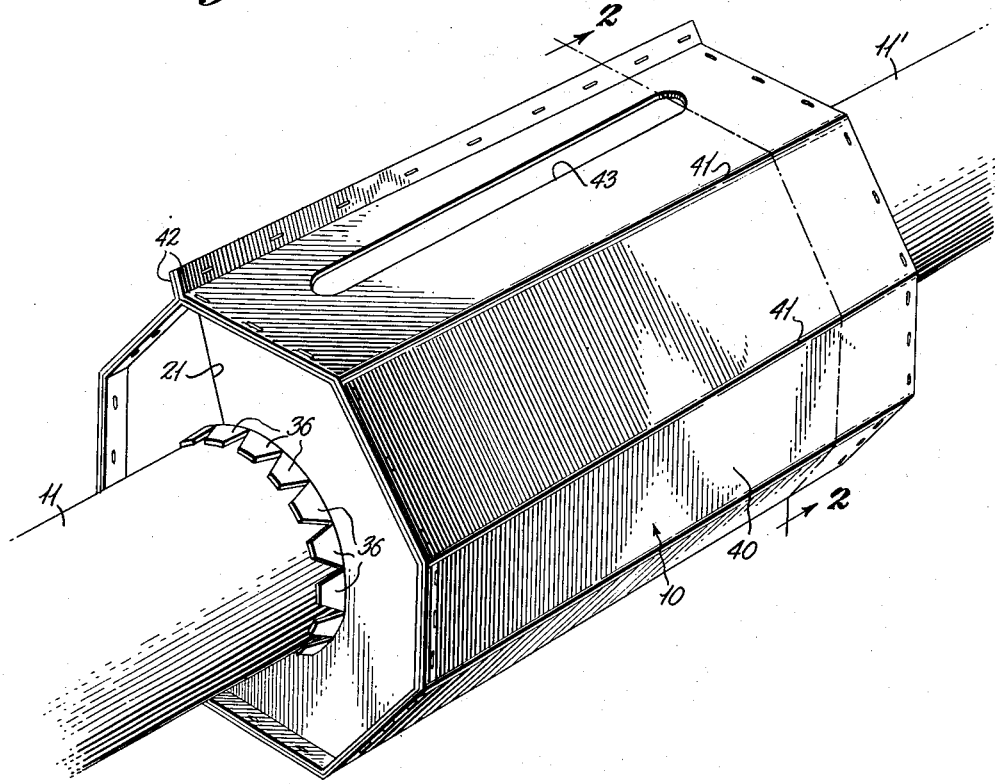
Figure 1 is a perspective view of a molding boot embodying the present invention illustrated in assembled position in a gas main field joint.
Figure 2:
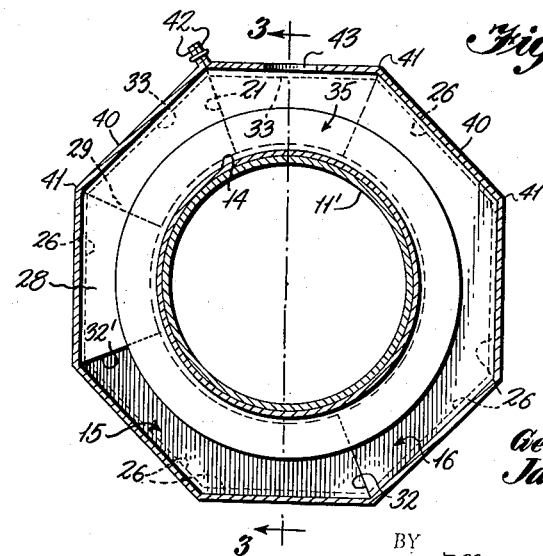
Figure 2 is a vertical transverse section, taken along the lines 2—2 of Figure 1.

The present invention comprises a molding boot for forming coatings of corrosion-resistant coating material about field joint couplings between gas main pipe sections. The boot is formed by assembling certain pre-formed sections of cardboard material or other sheet material consisting of a pair of end sections forming each end of the molding boot, and a side wall of sheet material wrapped around the end wall sections to complete the molding enclosure about the field joint coupling. The molding boot employs a novel arrangement of parts forming the end walls permitting the end walls to be assembled about the pipe sections and prevents seepage of the fluid coating material from the molding boot. While the molding boot of the present invention is specifically designed for use with field joints of the welded type or of the type commonly known in the trade as a dresser coupling joint, it may be used with other types of field joint couplings with equal facility. The specific embodiment described in detail herein and illustrated in the drawing has particular reference to a field joint of the type known as a dresser coupling joint.

The invention will be more clearly understood from the following description referring specifically to the accompanying drawing, wherein like reference characters designate corresponding parts throughout the several figures.

The molding boot of the present invention, indicated generally by reference character 10, is designed to be mounted upon gas main pipe sections 11, 11' to completely envelop a field joint such as indicated by reference character 12 coupling the ends of the adjacent pipe sections to form a gas main. In the embodiment illustrated, the adjacent pipe sections 11, 11' are joined at their ends by a coupling of the type known in the trades as a dresser coupling, indicated at 13, which generally comprises a plurality of flanged clamping plates embracing flanged ends of the pipe sections and secured together by longitudinal bolts.

The steel pipe sections 11, 11' of the type commonly used in the trade for such gas mains are provided with preformed coatings 14 of corrosion-resistant composition which extends substantially the length of the pipe sections and terminate, as indicated at 14', at a point near each end of the pipe section, leaving exposed steel pipe surfaces 14". The function of the molding boot 10 is to form a receptacle in which a continuous coating of corrosion-resistant material can be molded about the dresser coupling 13 and exposed steel pipe surfaces 14" to form an interrupted extension of the preformed corrosion-resistant coating on the steel pipe sections.

A pair of end wall sections 15, 16, are adapted to be assembled together to form the end wall for each end of the molding boot 10 and are specifically designed in the preferred embodiment to be conveniently assembled about pipe sections of the larger diameter employed in commercial gas mains, such as those on the order of twelve to sixteen inches in diameter. The outer end wall section 15 is formed of two panels 17 and 18 stapled or otherwise secured together to form a laminated unit. The outer panel 17 has an octagonal external periphery and is provided with a circular center opening 19 to accommodate the tubular pipe sections 11, 11'. A radial cut 21 extends between one of the angles of the octagonal outer periphery 20 of the panel 17 and the center opening 19, and radial scores 22 extend from the two angles next adjacent the angle from which the cut 21 extends, to define access flaps 23 which may be spread apart at the cut line 21 to permit the panel 17 to be fitted onto the pipe sections 11, 11' and seat the pipe sections in the opening 19.

The panel 18 secured to the panel 17 is of similar shape to the panel 17, having a central circular opening 24, and scores 25 constituting the sides of a regular octagon coextensive with that defined by the periphery 20 of the panel 17. Securing tabs 26 extend outwardly from the score lines along six sides of the octagon and are adapted to be folded outwardly over the octagonal periphery 20 of the panel member 17 to form a segment of an annular flange. The panel 18 is cut away in the area between ends 27, 27' aligned with the scores 22 of the panel 17, so that the end wall section 15 can be fitted over the steel pipe sections 11, 11'.

The inner end wall section 16 is formed of two panel members 28 and 29, and is likewise adapted to be assembled on the pipe sections 11 and 11' in face-to-face contact with the end wall section 15. The inner panel member 28 of the end wall section 16 is formed with an external octagonal periphery 30 and a central circular opening 31 to accommodate the circular cross-section pipe 11, 11'. A portion of the annular panel 28 is cut away along radial lines extending from angles spaced two sides apart defining ends 32, 32' between which the pipe sections 11, 11' may be admitted into the opening 31.

Secured to this panel member 28 by staples or other suitable means is the panel member 29, which is coextensive with and complementary to the discontinuous section of the octagonal panel 18 defined between the ends 27, 27'. This panel member 29 is provided with two securing tabs 33 hinged to the body of the panel 29 along scores 34 conforming to two sides of the octagon.

If desired to afford additional security against seepage at the central opening in the end wall sections 15, 16, an annular sealing ring, as indicated generally at 35, may be provided, which is provided with a circular series of orange peel sectors 36 bounding a central aperture therein and connected along a circular score line 37 to the body of the annular ring 35, permitting the orange peel sectors 36 to be bent outwardly and extended through the central apertures in the panels forming the end wall sections 15, 16 to overlie the surface of the pipe sections 11, 11' and seal the opening against seepage.

Each end wall of the molding boot 10 may be formed by assembling the sections 15, 16 onto the pipe 11, 11' until the pipe is seated in the central circular openings formed in the end wall sections, and drawing the sections 15, 16 together until the panel 29 is fitted into the opening defined between the ends 27, 27' of the panel 18.

The securing tabs 26 and 33 of the panels 18 and 29 are then bent outwardly away from the dresser coupling or joint to lie in planes parallel with axis of the pipe sections 11, 11' and define a continuous flange extending around each end wall, about which a continuous sheet of cardboard or like material is to be wrapped and secured to form the side wall 40 of the boot. The side wall 40 is preferably formed of a single sheet of cardboard material, which is scored transversely as indicated at 41 to permit the side wall 40 to conform to the octagonal periphery of the end walls. Securing tabs 42 are formed at each end of the panel forming the side wall 40 to be stapled or otherwise secured together and complete the enclosure.

The end walls are to be so spaced from each other relative to the transverse dimensions of the panel forming the side wall 40 so that the edges of the side wall-forming panel may overlie the flange-forming tabs 26 and 33 to permit a stapler or other securing tool to be fitted over the overlying ends of the securing tabs and side wall-forming panel to staple or otherwise secure these elements together. Preferably an elongated slot 43 is formed in a section of the side wall-forming panel lying between two adjacent scores 41, this section to form the upwardly facing side wall section when the molding boot is assembled, so that the molten corrosion-resistant material can be poured into the molding boot through the opening 42.

While but one particular embodiment of the invention has been particularly shown and described, it is distinctly understood that the invention is not limited thereto but that various modifications may be made in the invention without departing from the spirit and scope thereof, and it is desired, therefore, that only such limitations shall be placed thereon as are imposed by the prior art and are set forth in the appended claims.

What is claimed is:

1. In a molding boot of sheet material adapted to form an envelope about a pipe field joint for molding corrosion-resistant coatings thereon and having a tubular side wall of sheet material coaxially disposed about the field joint, end walls closing the ends of the tubular side wall of said boot, said end walls each comprising outer and inner end wall sections, the outer end wall section having a first annular panel having a hinged sector forming an opening for admitting a pipe in the central aperture therein and a second annular panel superposed thereon and conforming in shape to said first panel, said second panel having a discontinuous portion complementary to and aligned with said hinged sector to define a recess, and said inner end wall section having a first annular panel coextensive with said second outer wall panel and a discontinuous portion for admission of a pipe to seat in the central opening therein and a second panel coextensive with and complementary to the discontinuous portion of said second outer wall panel and superposed on said first inner wall panel, said second panels being disposed in nested relation lying in a single plane when said boot is in assembled condition, securing tabs hinged along score lines complementary to the external periphery of said first panels and folded at right angles to said panels to define an annular flange at the periphery thereof, and means securing said tubular side wall of sheet material to the annular flanges formed by said securing tabs to form an enclosure completely surrounding said field joint.

2. In a molding boot of sheet material adapted to form an envelope about a pipe field joint for molding corrosion-resistant coatings thereon and having a tubular side wall of sheet material coaxially disposed about the field joint, end walls for each end of said boot closing the ends of the tubular side wall thereof, said end walls each comprising outer and inner end wall sections, the outer end wall section having a first annular panel having a hinged sector forming an opening for admitting a pipe through the panel to seat in the central aperture therein and a second annular panel superposed thereon and conforming in shape to said first panel, said second panel having a discontinuous portion complementary to and aligned with said hinged sector to define a recess, and said inner end wall section having a first annular panel coextensive with said second outer wall panel and a discontinuous portion for admission of a pipe to seat in the central opening therein and a second panel coextensive with and complementary to the discontinuous portion of said second outer wall panel and superposed on said first inner wall panel, said second panels being disposed in nested relation lying in a single plane when said boot is in assembled condition, securing tabs hinged along score lines complementary to the external periphery of said first panels and folded at right angles to said panels to define an annular flange at the periphery thereof, and means securing said tubular side wall of sheet material along the lateral edges thereof to the annular flanges formed by said securing tabs to form an enclosure completely surrounding said field joint.

3. In a molding boot of sheet material adapted to form an envelope about a pipe field joint for molding corrosion-resistant coatings thereon and having a tubular side wall of polygonal cross-section of sheet material coaxially disposed about the field joint, end walls closing the ends of the tubular side wall of said boot, said end walls each comprising outer and inner end wall sections, the outer end wall section having a first panel in the form of an externally polygonal annulus having a hinged sector forming an opening for admitting a pipe in the central aperture therein and a second annular panel superposed thereon and conforming in shape to said first panel, said second panel having a discontinuous portion complementary to and aligned with said hinged sector to define a recess, and said inner end wall section having a first panel in the form of an externally polygonal annulus coextensive with said second outer wall panel and a discontinuous portion for admission of a pipe to seat in the central opening therein and a second panel coextensive with and complementary to the discontinuous portion of said second outer wall panel and superposed on said first inner wall panel, said second panels being disposed in nested relation lying in a single plane when said boot is in assembled condition, securing tabs hinged along score lines complementary to the external periphery of said first panels and folded at right angles to said panels to define an annular polygonal flange at the periphery thereof, and means securing said tubular side wall of sheet material to the annular flanges formed by said securing tabs to form an enclosure completely surrounding said field joint.

4. In a molding boot of sheet material adapted to form an envelope about a pipe field joint for molding corrosion-resistant coatings thereon and having a side wall formed of an octagonal tube of sheet material coaxially disposed about the field joint, end walls closing the ends of the tubular side wall of said boot, said end walls each comprising outer and inner end wall sections, the outer end wall section having a first panel in the form of an externally octagonal annulus having a pair of flaps bounding a radial cut through said annulus and hinged along radial scores extending from angles of said octagonal annulus forming a hinged sector for admitting a pipe in the central aperture therein and a second annular panel superposed thereon and conforming in shape to said first panel, said second panel having a discontinuous portion complementary to and aligned with said hinged sector to define a recess, and said inner end wall section having a first panel in the form of an externally octagonal annulus coextensive with said second outer wall panel and a discontinuous portion coextensive with said hinged sector for admission of a pipe to seat in the central opening therein and a second panel coextensive with and complementary to the discontinuous portion of said second outer wall panel and superposed on said first inner wall panel, said second panels being disposed in nested relation lying in a single plane when said boot is in assembled condition, securing tabs hinged along score lines complementary to the sides of the external octagonal periphery of said first panels and folded at right angles to said panels to define an annular octagonal flange at the periphery thereof, means securing said tubular side wall of sheet material to the annular flanges formed by said securing tabs to form an enclosure completely surrounding said field joint and said tubular side wall having an opening therein for admission of molten corrosion-resistant material into said enclosure.

5. In a molding boot of sheet material adapted to form an envelope about a pipe field joint for molding corrosion-resistant coatings thereon and having a side wall formed of an octagonal tube of sheet material coaxially disposed about the field joint, end walls closing the ends of the tubular side wall of said boot, said end walls each comprising outer and inner end wall sections, the outer end wall section having a first panel in the form of an externally octagonal annulus having a pair of flaps bounding a radial cut through said annulus and hinged along radial scores extending from angles of said octagonal annulus forming a hinged sector for admitting a pipe in the central aperture therein and a second annular panel superposed thereon and conforming in shape to said first panel, said second panel having a discontinuous portion complementary to and aligned with said hinged sector to define a recess, and said inner end wall section having a first panel in the form of an externally octagonal annulus coextensive with said second outer wall panel and a discontinuous portion coextensive with said hinged sector for admission of a pipe to seat in the central opening therein and a second panel coextensive with and complementary to the discontinuous portion of said second outer wall panel and superposed on said first inner wall panel, said second inner wall panel being interfitted in the discontinuous portion of said second outer wall panel to complete an externally octagonal annulus therewith, securing tabs hinged along score lines complementary to the sides of the external octagonal periphery of said first panels and folded at right angles to said panels to define an annular octagonal flange at the periphery thereof, means securing said tubular side wall of sheet material to the annular flanges formed by said securing tabs to form an enclosure completely surrounding said field joint and said tubular side wall having an opening therein for admission of molten corrosion-resistant material into said enclosure.

6. In a molding boot of sheet material adapted to form an envelope about a pipe field joint for molding corrosion-resistant coatings thereon and having a side wall formed of an octagonal tube of sheet material coaxially disposed about the field joint, end walls closing the ends of the tubular side wall of said boot, said end walls each comprising outer and inner end wall sections, the outer end wall section having a first panel in the form of an externally octagonal annulus having a pair of flaps bounding a radial cut through said annulus and hinged along radial scores extending from angles of said octagonal annulus forming a hinged sector for admitting a pipe in the central aperture therein and a second annular panel superposed thereon and conforming in shape to said first panel, said second panel having a discontinuous portion complementary to and aligned with said hinged sector to define a recess, and said inner end wall section having a first panel in the form of an externally octagonal annulus coextensive with said second outer wall panel and a discontinuous portion coextensive with said hinged sector for admission of a pipe to seat in the central opening therein and a second panel coextensive with and complementary to the discontinuous portion of said second outer wall panel and superposed on said first inner wall panel, said second inner wall panel being interfitted in the discontinuous portion of said second outer wall panel to complete an externally octagonal annulus therewith, securing tabs hinged along score lines complementary to the sides of the external octagonal periphery of said first panels and folded at right angles to said panels to define an annular octagonal flange at the periphery thereof, said tubular side wall being disposed in surrounding relation to said end walls with the lateral edges thereof overlying and secured to the annular flanges at the external periphery of said end walls formed by said securing tabs, and said tubular side wall having an opening therein for admission of molten corrosion-resistant material into said enclosure.

GEO. P. KILLIAN.
JAMES A. KILIAN.

References Cited in the file of this patent

UNITED STATES PATENTS

| Number | Name | Date |
|---|---|---|
| 1,462,077 | Weston | July 17, 1923 |
| 1,512,660 | Wright et al. | Oct. 21, 1924 |
| 1,867,476 | Rogers | July 12, 1932 |
| 1,947,413 | Hay | Feb. 13, 1934 |
| 2,055,885 | Weston | Sept. 29, 1936 |
| 2,127,694 | Miller | Aug. 23, 1938 |
| 2,308,793 | Upton | Jan. 19, 1943 |